(12) United States Patent
Von Schmittou et al.

(10) Patent No.: US 7,186,769 B2
(45) Date of Patent: *Mar. 6, 2007

(54) WATER-DISPERSIBLE POLYESTER STABILIZED FLUOROALKYL COMPOSITIONS

(75) Inventors: James Foster Von Schmittou, Spartanburg, SC (US); Darrell Scott Nasser, Easley, SC (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 50 days.

This patent is subject to a terminal disclaimer.

(21) Appl. No.: 10/639,723

(22) Filed: Aug. 12, 2003

(65) Prior Publication Data

US 2005/0038178 A1 Feb. 17, 2005

(51) Int. Cl.
*C08L 33/16* (2006.01)

(52) U.S. Cl. .................. 524/457; 524/544; 524/556; 524/805

(58) Field of Classification Search ............... 524/544, 524/805, 513, 457, 556; 525/42
See application file for complete search history.

(56) References Cited

U.S. PATENT DOCUMENTS

| | | | |
|---|---|---|---|
| 3,062,765 A | 11/1962 | Sherman et al. | |
| 3,277,039 A | 10/1966 | Marascia et al. | |
| 3,282,905 A | 11/1966 | Fasick et al. | |
| 3,442,842 A | 5/1969 | Von Bonin | |
| 3,462,296 A | 8/1969 | Raynolds et al. | |
| 3,491,169 A | 1/1970 | Raynolds et al. | |
| 3,645,990 A | 2/1972 | Raynolds | |
| 3,997,507 A | 12/1976 | Kirimoto et al. | |
| 4,090,991 A | 5/1978 | Fukusaki et al. | |
| 4,410,687 A | 10/1983 | Schimmel et al. | |
| 4,564,561 A | 1/1986 | Lore et al. | |
| 4,595,518 A | 6/1986 | Raynolds et al. | |
| 4,666,977 A | 5/1987 | Kihara et al. | |
| 4,735,990 A | 4/1988 | Kihara et al. | |
| 4,781,844 A | 11/1988 | Kortmann et al. | |
| 4,839,413 A | 6/1989 | Kiehlbauch et al. | |
| 4,914,142 A * | 4/1990 | Takarabe et al. | ............. 523/511 |
| 4,927,876 A | 5/1990 | Coogan et al. | |
| 4,946,932 A * | 8/1990 | Jenkins | ........................ 528/272 |
| 5,011,883 A | 4/1991 | Aksman | |
| 5,093,398 A | 3/1992 | Röttger et al. | |
| 5,137,961 A | 8/1992 | Goos et al. | |
| 5,247,040 A | 9/1993 | Amick et al. | |
| 5,376,441 A | 12/1994 | Wu et al. | |
| 5,539,047 A | 7/1996 | Wu et al. | |
| 5,686,518 A | 11/1997 | Fontenot et al. | |
| 5,883,175 A | 3/1999 | Kubo et al. | |
| 5,985,983 A | 11/1999 | Yamada et al. | |
| 6,001,922 A * | 12/1999 | Clark et al. | .................. 524/513 |
| 6,015,848 A * | 1/2000 | Ikushima et al. | ........... 523/427 |
| 6,093,384 A * | 7/2000 | Lion et al. | ...................... 424/45 |
| 6,121,372 A | 9/2000 | Yamamoto et al. | |
| 6,159,548 A | 12/2000 | Moody | |
| 6,180,740 B1 | 1/2001 | Fitzgerald | |
| 6,218,464 B1* | 4/2001 | Parker et al. | ................ 524/805 |
| 6,271,283 B1 | 8/2001 | Shimado et al. | |
| 6,774,176 B1* | 8/2004 | Nzudie et al. | ............... 524/544 |
| 2002/0169249 A1 | 11/2002 | Borst et al. | |
| 2002/0173610 A1* | 11/2002 | Aert et al. | ................. 526/303.1 |
| 2003/0207202 A1* | 11/2003 | Fujita et al. | .............. 430/270.1 |
| 2005/0038154 A1* | 2/2005 | Von Schmittou et al. | ... 524/284 |
| 2005/0038168 A1* | 2/2005 | Von Schmittou et al. | ... 524/457 |

FOREIGN PATENT DOCUMENTS

| | | |
|---|---|---|
| EP | 0 273 449 A1 | 7/1988 |
| EP | 0 648 887 A1 | 4/1993 |
| JP | 04007375 A * | 1/1992 |

OTHER PUBLICATIONS

Copending U.S. Appl. No. 10/639,576, U.S. Appl. No. 10/639,414 and U.S. Appl. No. 10/639,726 all filed on Aug. 12, 2003.*
Copending U.S. Appl. No. 10/639,576, U.S. Appl. No. 10/639,414, U.S. Appl. No. 10/639,726.*
Emulsion and Miniemulsion Copolymerization of Acrylic Monomers in the Presence of Alkyd Resin, *Journal of Applied Polymer Science*, vol. 60, pp. 2069-2076 (1996).

* cited by examiner

*Primary Examiner*—Ling-Sui Choi
*Assistant Examiner*—Satya B. Sastri

(57) ABSTRACT

In this invention, an aqueous dispersion is provided to improve the oil and water repellency of materials. The aqueous dispersion comprises a polymer, at least one water dispersible polyester, and water; wherein the polymer comprises the repeating units from at least one fluoroalkyl monomer and optionally, at least one ethylenically unsaturated monomer.

This invention also provides an article coated with the aqueous dispersion.

46 Claims, No Drawings

WATER-DISPERSIBLE POLYESTER STABILIZED FLUOROALKYL COMPOSITIONS

FIELD OF THE INVENTION

This invention is related to compositions that provide oil and water-repellancy to articles. Particularly, this invention relates to an oil and water-repellant composition comprising at least one polymer, at least one water-dispersible polyester,,and water; wherein the polymer comprises at least one fluoroalkyl monomer. More particularly, this invention relates to an oil and water repellant composition comprising at least one polymer, a polyethylene glycol polyester, and water; wherein the polymer comprises a perfluoroalkyl acrylate.

BACKGROUND OF THE INVENTION

Polymers and other compounds containing fluorinated monomers have been used for providing oil and water repellency to textile substrates, such as, fabrics and paper. These fluoroalkyl polymers are typically produced by emulsion polymerization utilizing either an anionic or a cationic surfactant to stabilize the emulsion. These surfactants used to produce the fluoroalkyl polymers can cause foaming and degradation of the oil and water repellency of the fluoroalkyl polymer contained on the textile substrate. There is a need in the textile industry to develop an aqueous dispersion of a fluoroalkyl polymer utilizing a surfactant that does not foam and degrade the oil and water repellency of the fluoroalkyl polymer.

Applicants provide a novel, oil and water repellent composition comprising at least one polymer, at least one water-dispersible polyester, and water that reduces foaming and degradation of the oil and water repellency of the fluoroalkyl polymer.

BRIEF SUMMARY OF THE INVENTION

It is an object of this invention to provide an aqueous dispersion that provides oil and water-repellency to articles. The aqueous dispersion comprises at least one polymer, at least one water dispersible polyester, and water; wherein the polymer comprises repeating units from at least one fluoroalkyl monomer.

It is another object of this invention to provide substrates and articles coated with the aqueous dispersion.

In accordance with one embodiment of the invention, a pre-emulsion is provided. The pre-emulsion comprises at least one fluoroalkyl monomer, at least one water dispersible polyester, and water.

In accordance with another embodiment of the invention, a miniemulsion is provided. The mini-emulsion comprises at least one fluoroalkyl monomer, at least one water dispersible polyester, and water.

In accordance with still another embodiment of the invention, an aqueous dispersion is provided. The aqueous dispersion comprises a polymer, at least one water dispersible polyester, and water; wherein the polymer comprises the repeating units from at least one fluoroalkyl monomer and optionally, at least one ethylenically unsaturated monomer.

In accordance with yet another embodiment of the invention, an article coated with the aqueous dispersion is provided.

DETAILED DESCRIPTION

In the present invention, an aqueous dispersion is provided. The aqueous dispersion comprises a polymer, at least one water-dispersible polyester, and water; wherein the polymer comprises the repeating units from at least one fluoroalkyl monomer.

The fluoroalkyl monomer is a (meth)acrylate having a Rf group. The (meth)acrylate having a Rf group is a compound wherein the Rf group is present in the alcohol residue moiety of the (meth)acrylate. The Rf group is a group having at least two hydrogen atoms of an alkyl group substituted by fluorine atoms.

The carbon number of the Rf group is from 2 to about 20, preferably from about 4 to about 16, and most preferably from 6 to 14. The Rf group is preferably a straight chain or branched group. In the case of a branched group, the branched moiety is present at the terminal portion of the Rf group and preferably a short chain having from 1 to 4 carbon atoms. The Rf group may contain other halogen atoms in addition to fluorine atoms. As such, chlorine atoms are preferred. Further, an etheric oxygen atom may be inserted between carbon atoms in the Rf group.

The number of fluorine atoms in the Rf group is preferably at least about 60%, more preferably at least 80%, as represented by [(the number of fluorine atoms in the Rf group)/(the number of hydrogen atoms contained in an alkyl group having the same carbon number as the Rf group)]× 100(%). Further, the Rf group is preferably a group having all of hydrogen atoms of an alkyl group substituted by fluorine atoms (i.e. a perfluoroalkyl group).

The number of carbon atoms in the perfluoroalkyl group is preferably from 2 to about 20, more preferably from about 4 to about 16, and most preferably from 6 to 14. If the carbon number is less than 2, the water repellency and oil repellency of the aqueous dispersion tend to be low. If the carbon number exceeds 20, the (meth)acrylate having a perfluoroalky group tends to be solid at room temperature making handling difficult.

In one embodiment, the fluoroalkyl monomer is represented by Formula 1:

$$Rf\text{-}Q\text{-}OCOCR=CH_2 \tag{1}$$

wherein Rf is defined as discussed previously, Q is a bivalent organic group, and R is a hydrogen atom or a methyl group. Q is preferably $(CH_2)_{p+q}$—; —$(CH_2)_p CONH(CH_2)_q$—; —$(CH_2)_p OCONH(CH_2)_q$—; —$(CH_2)_p SO_2 NR'(CH_2)_q$—; —$(CH_2)_p NHCONH(CH_2)_q$— or —$(CH_2)_p CH(OH)$ —$(CH_2)_q$—, wherein R' is a hydrogen or an alkyl group, and each of p and q is an integer of at least 0, provided that p+q is an integer of from 1 to 22. It is preferred that Q is —$(CH_2)_{p+q}$—; —$(CH_2)_p CONH(CH_2)_q$—; —$(CH_2)_p SO_2 NR'(CH_2)_q$—; wherein q is an integer of at least 2; and p+q is from 2 to 6. Particularly preferred is $(CH_2)_{p+q}$, wherein p+q is from 2 to 6.

Specific examples of the (meth)acrylate having a Rf group include, but are not limited to:
$F(CF_2)_5 CH_2 OCOCR=CH_2$,
$F(CF_2)_6 CH_2 CH_2 OCOCR=CH_2$,
$H(CF_2)_6 CH_2 CH_2 OCOCR=CH_2$,
$F(CF_2)_8 CH_2 CH_2 OCOCR=CH_2$,
$i\text{-}C_3 F_7 (CF_2)_5 CH_2 CH_2 OCOCR=CH_2$,
$F(CF_2)_8 SO_2 N(C_3 H_7) CH_2 CH_2 OCOCR=CH_2$,
$F(CF_2)_8 (CH_2)_4 OCOCR=CH_2$,
$F(CF_2)_8 SO_2 N(CH_3) CH_2 CH_2 OCOCR=CH_2$,
$F(CF_2)_8 SO_2 N(C_2 H_5) CH_2 CH_2 OCOCR=CH_2$, $F(CF_2)_8CONHCH_2CH_2OCOCR=CH_2$,
$i\text{-}C_3F_7(CF_2)_5(CH_2)_3OCOCR=CH_2$,
$i\text{-}C_3F_7(CF_2)_5CH_2CH(OCOCH_3)OCOCR=CH_2$,
$i\text{-}C_3F_7(CF_2)_5CH_2CH_2CH(OH)CH_2OCOCR=CH_2$,
$F(CF_2)_9CH_2CH_2OCOCR=CH_2$, and
$F(CF_2)_9CONHCH_2CH_2OCOCR=CH_2$.

In these examples, R represents a hydrogen or a methyl group, and $i\text{-}C_3F_7$ represents a perfluoroisopropyl group $[(CF_3)_2CF{-}]$.

Two or more types of fluoroalkyl monomers may be used in combination. Preferably, the fluoroalkyl monomer is selected from the group consisting of perfluoroalkylmethyl acrylate and perfluoroalkylethyl acrylate. More preferably, the fluoroalkyl compound is perfluoroalkylethyl acrylate or perfluoroalkylmethyl acrylate; wherein the alkyl group has about 6 to about 14 carbon atoms. Most preferably, the fluoroalkyl compound is perfluoroalkylethyl methacrylate In another embodiment of this invention, the polymer in the aqueous dispersion comprises the repeating units from at least one fluoroalkyl monomer and from at least one ethylenically unsaturated monomer. The ethylenically unsaturated monomer is at least one acrylic or vinyl monomer known in the art capable of polymerizing with the fluoroalkyl monomer. The ethylenically unsaturated monomer can be added as a single type of monomer or as a mixture. Examples of suitable ethylenically unsaturated monomers, include, but are not limited to, styrenic compounds, ethylenically unsaturated compounds, nitrogen-containing compounds, vinyl chloride, and vinylidene chloride.

Suitable styrenic compounds include, but are not limited to, styrene, α-methyl styrene, vinyl naphthalene, vinyl toluene, chloromethyl styrene, and the like.

Ethylenically unsaturated compounds include, but are not limited to, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, octyl acrylate, octyl methacrylate, isodecyl acrylate, isodecyl methacrylate, lauryl methacrylate, lauryl acrylate, tridecyl acrylate, tridecyl methacrylate, stearyl acrylate, stearyl methacrylate, glycidyl methacrylate, alkyl crotonates, vinyl acetate, di-n-butyl maleate, di-octylmaleate, acetoacetoxyethyl methacrylate, acetoacetoxyethyl acrylate, acetoacetoxypropyl methacrylate, acetoacetoxypropyl acrylate, diacetone acrylamide, acrylamide, methacrylamide, hydroxyethyl methacrylate, hydroxyethyl acrylate, allyl methacrylate, tetrahydrofurfuryl methacrylate, tetrahydrofurfuryl acrylate, cyclohexyl methacrylate, cyclohexyl acrylate, n-hexyl acrylate, n-hexyl methacrylate, 2-ethoxyethyl acrylate, 2-ethoxyethyl methacrylate, isodecyl methacrylate, isodecyl acrylate, 2-methoxy acrylate, 2-methoxy methacrylate, 2-(2-ethoxyethoxy)ethylacrylate, 2-phenoxyethyl acrylate, 2-phenoxyethyl methacrylate, isobornyl acrylate, isobornyl methacrylate, caprolactone acrylate, caprolactone methacrylate, polypropyleneglycol monoacrylate, polypropyleneglycol monomethacrylate, poyethyleneglycol(400) acrylate, polypropyleneglycol(400) methacrylate, benzyl acrylate, benzyl methacrylate, sodium 1-allyloxy-2-hydroylpropyl sulfonate, acrylonitrile, and the like.

Nitrogen-containing compounds include, but are not limited to, methacrylamide, t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, 2-acrylamido-2-methylpropanesulfonic acid, N-(2-methacryloyloxy-ethyl)ethylene urea, methacrylamidoethylethylene urea, and the like.

Ethylenically unsaturated monomers are described in "The Brandon Worldwide Monomer Reference Guide and Sourcebook" Second Edition, 1992, Brandon Associates, Merrimack, New Hampshire; and in "Polymers and Monomers", the 1996–1997 Catalog from Polyscience, Inc., Warrington, Pa.

Two or more of the ethylenically unsaturated monomers may be used in combination. Preferably, the ethylenically unsaturated monomer has up to about 18 carbon atoms, such as, 2-ethylhexyl acrylate, 2-ethylhexyl methacrylate, lauryl methacrylate and stearyl methacrylate. Most preferably, the ethylenically unsaturated monomer is lauryl methacrylate.

The amount of fluoroalkyl monomer repeating units in the polymer ranges from about 50 to about 100 weight percent based on the total weight of monomer utilized to produce the polymer. Preferably, the amount of fluoroalkyl repeating units in the polymer ranges from 60 to 80 weight percent based on the total weight of monomer utilized to produce the polymer.

The weight average molecular weight (Mw) of the polymer ranges from about 3000 to about 2,000,000, preferably 10,000 to 500,000 as determined by gel permeation chromatography.

The water-dispersible polyester can be any water-dispersible polyester that is known in the art capable of emulsifying the fluoroalkyl monomer, and optionally, the ethyleneically unsaturated monomer and stabilizing the aqueous dispersion. The water-dispersible polyester can be either a nonionic or anionic water-dispersible polyester. Examples of water-dispersible polyesters sold by Eastman Chemical Company include LUBRIL QC, LUBRIL QCX, LUBRIL QCF, LUBRIL QCJ, VELVETOL 1471, and VELVETOL 251C. Other water-dispersible polyesters include MILEASE T, MILEASE HPA, HILEASE NUVA, and AFILAN 8228 sold by Clariant, and ASTRAPLUSH and TANAPAL ACF sold by Bayer. Preferably, the water-dispersible polyester is nonionic. Polyethylene glycol polyester is the preferred water-dispersible polyester. Polyethylene glycol polyester is available from Eastman Chemical Company as LUBRIL QC. The amount of water-dispersible polyester solids in the aqueous dispersion ranges from about 1% to about 20% based on the total weight of the aqueous dispersion, preferably from about 1% to about 5%, and most preferably 3% to 5%.

The aqueous dispersion may be prepared by any polymerization method known in the art. In one embodiment, a process to produce an aqueous dispersion is provided. The process comprises: 1) contacting at least one fluoroalkyl monomer, at least one water-dispersible polyester, water, and optionally an ethylenically unsaturated monomer to produce a mixture; and 2) polymerizing the mixture to produce the aqueous dispersion.

Preferably, the aqueous dispersion is prepared by using emulsion polymerization techniques. The polymer may, as is known in the art, be prepared using free radical emulsion polymerization techniques that yield structured or unstructured particles. Structured particles include, for example, core/shell particles, raspberry particles, and gradient particles. The process is carried out in an emulsion polymerization zone comprising at least one reactor in the presence of an initiator. Generally, the reactor is fitted with a stirrer and external means for either heating or cooling the charge. The polymerization temperature is not particularly limited to a certain value, but is preferably from about 20° C. to about 155° C., and most preferably from 40° C to 85° C.

Any initiator known in the art for emulsion polymerization can be utilized. Typical initiators include, but are not limited to, hydrogen peroxide, potassium or ammonium peroxydisulfate, dibenzoyl peroxide, lauryl peroxide, ditertiary butyl peroxide, ammonium persulfate, alkali persulfuate, 2,2'-azobisisobutyronitrile, t-butyl hydroperoxide, benzoyl peroxide, dicetyl peroxydicarbonate, tertiarybutylperoxy neodecanoate, tertiarybutylperoxy benzoate, cumene hydroperoxide, dicumylperoxide, di-benzoyl peroxide, 2,2'azobis(2-aminopropane)dihydrochloride, 2,2'-azobis[2-(2-imidazolin-2-yl)propane] dihydrochloride and the like. Preferably, the initiator is 2,2'azobis(2-aminopropane)dihydrochloride. The amount of initiator utilized in the polymerization process is that which is sufficient to polymerize the fluoroalkyl monomer and optionally, the ethylenically unsaturated monomer. Preferably, the amount of initiator ranges from about 0.2 to about 1% by weight based on the total amount of monomer, most preferably, 0.1 to 0.2% by weight.

One advantage of this inventive process is that water-soluble organic solvents are not necessary to improve the emulsifiability, therefore, the aqueous dispersion has less volatile organic compound content than other fluoroalkyl aqueous dispersions utilizing solvents. However, water-soluble organic solvents can be used to produce the inventive aqueous dispersions. Examples of water-soluble organic solvents include, but are not limited to, acetone, methyl ethyl ketone, ethyl acetate, propylene glycol, dipropylene glycol, tripropylene glycol, ethanol and the like. The water-soluble organic solvent is usually used in the amount of not more than about 30 parts by weight, preferably from 5 to 20 parts by weight, based on 100 parts by weight of the total amount of monomer.

Reducing agents, catalysts, chain transfer agents, crosslinking agents, reactive surfactants, and water-dispersible/water-soluble polymers known in the art may be used to prepare the polymer. The sequence of addition of these compounds can vary, and these compounds can be added to the polymerization process at varying times.

Suitable reducing agents are those that increase the rate of polymerization and include for example, sodium sulfite, sodium bisulfite, sodium metabisulfite, sodium hydrosulfite, sodium formaldehyde sulfoxylate, sodium thiosulfate, ascorbic acid, isoascorbic acid, and mixtures thereof. The amount of reducing agent ranges from about 0.1% to about 2% based on the total weight of the monomers, preferably from 0.1% to 0.3% based on the total weight of the monomers.

Polymerization catalysts are those compounds which increase the rate of polymerization and which, in combination with the previously described reducing agents, may promote decomposition of the initiator under reaction conditions. Suitable catalysts include, but are not limited to, transition metal compounds such as, for example, ferrous sulfate heptahydrate, chelated forms of ferrous sulfate heptahydrate, ferrous chloride, cupric sulfate, cupric chloride, cobalt acetate, cobaltous sulfate, and mixtures thereof. Generally, the amount of catalyst ranges from about 0.0001% to about 0.05% based on the total weight of the monomers, preferably from 0.001% to 0.01%.

Any chain transfer agent known in the art may be utilized that is capable of controlling the molecular weight of the polymer. Exemplary chain transfer agents include, but are not limited to, butyl mercaptan, mercaptopropionic acid, 2-ethylhexyl 3-mercaptopropionate, n-butyl 3-mercaptopropionate, octyl mercaptan, N-dodecyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate, carbon tetrabromide, bromoform, bromotrichloromethane, sodium hypophosphite and the reactive chain transfer agents taught in U.S. Pat. No. 5,247,040, incorporated herein by reference. In particular, N-dodecyl mercaptan represents a preferred chain transfer agent. Generally, the amount of the chain transfer agent added ranges from about 0.1 to about 1% by weight based on the total amount of monomer, preferably from 0.1 to 0.3% by weight.

Crosslinking agents can be any compounds that are known in the art and can be used to impart improved crosslinking, latex stability and substantivity to the polymer. The crosslinking agents can be external or internal crosslinking agents. External-crosslinking agents cause crosslinking during drying or curing of a polymer while internal crosslinking agents cause crosslinking to occur during polymerization.

Suitable external crosslinking agents include, but are not limited to, poly(oxyethylene) (meth)acrylates, N-methylol acrylamide or N-methylol methacrylamide, N-butoxymethyl acrylamide, hydroxylethyl(meth) acrylate, 2-hydroxybutyl (meth)acrylate, 2-hydroxypropyl (meth)acrylate, 3-chloro-2-hydroxypropyl (meth)acrylate, and glycidyl (meth)acrylate. An example of poly(oxyethylene) (meth)acrylates include polyethylene glycol methacrylate. The amount of external crosslinking agent can range from about 0.1 to about 5% by weight based on the total amount of monomer, preferably from 2 to 3% by weight based on the total amount of monomer.

Suitable examples of internal crosslinking agents include, but are not limited to, diallylmaleate, divinylbenzene, triethyleneglycol dimethacrylate, ethyleneglycol dimethacrylate, 1,3 butyleneglycol diacrylate, 1,4 butanediol diacrylate, 1,6 hexanediol diacrylate, neopentyl glycol diacrylate, polyethylene glycol (600) dimethacrylate, polyethylene glycol (200) diacrylate, ethoxylated bisphenol A diacrylate, tris (2-hydroxyethyl) isocyanurate trimethacrylate, trimethylolpropane triacrylate, pentaerythritol triacrylate, ethoxylated trimethylolpropane triacrylate, propoxylated trimethylolpropane triacrylate, propoxylated glyceryl triacrylate, pentaerythritol tetraacrylate, and ethoxylated pentaerythritol tetraacrylate. The amount of the internal crosslinking agents can range from about 0.1 to about 5% by weight based on the total amount of monomer, preferably from 1 to 2% by weight based on the total amount of monomer.

In the preparation of the aqueous dispersion, fluoroalkyl monomers, such as described previously, can be reacted with at least one non-self-polymerizable, surface-active vinyl monomer (also known as a non-self-polymerizable ethylenically-unsaturated surfactant or a reactive surfactant). Non-self-polymerizable, surface-active vinyl monomers will hereinafter be referred to as a reactive surfactant. The reactive surfactant, rather than polymerizing to form a separate polymeric surfactant, is substantially (preferably completely) incorporated into the polymer of the invention. Thus, the reactive surfactant becomes part of the polymer. Reactive surfactants possessing, for example, isopropenylphenyl or allyl groups are preferred. Examples include reactive surfactants sold by PPG Industries, Inc., as MAZON® SAM 181, 183, 184, 211 surfactants which are anionic sulfates or sulfonates and MAZON® SAM 185–187 surfactants which are nonionic surfactants. Other reactive surfactants include the macro monomers sold by Daiichi Kogyo Seiyaku under the names NIOGEN RN, AQUARON or HITENOL surfactants. These include polyoxyethylene alkyl phenyl ether compounds of the general formulae (2), (3), and (4):

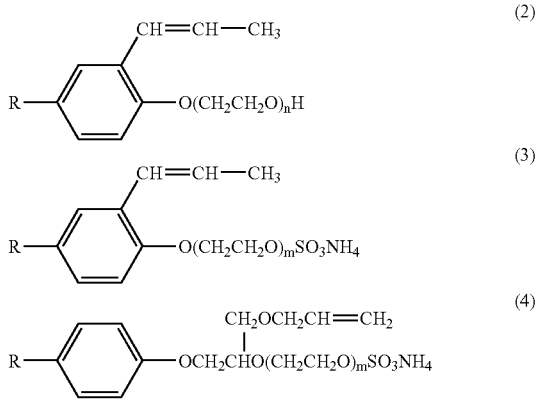

In Formulae (2), (3), and (4), R is nonyl or octyl, and n and m are preferably integers of from 15 to 50 and 15 to 40, respectively. More preferably, n ranges from 20 to 40, and m from 15 to 25. HITENOL RN, HITENOL HS-20 and HITENOL A-10 products are particularly preferred reactive surfactants. Other such reactive surfactants include the sodium alkyl allyl sulfosuccinate sold by Henkel, under the trade name TREM LF40 surfactant.

Water-dispersible and water-soluble polymers may also be employed as surfactants/stabilizers in the aqueous dispersion of the invention. Examples of such polymeric stabilizers include water-dispersible polyurethanes as described in U.S. Pat. Nos. 4,927,876 and 5,137,961; and alkali-soluble acrylic resins as described in U.S. Pat. No. 4,839,413; both of which are herein incorporated by reference.

In one embodiment of this invention, the aqueous dispersion is produced by a process comprising: 1) contacting at least one fluoroalkyl monomer, at least one water-dispersible polyester, water and optionally, at least one ethylenically unsaturated monomer to form an pre-emulsion; and 2) polymerizing the pre-emulsion in a emulsion polymerization zone under emulsion polymerization conditions to produce the aqueous dispersion. The emulsion polymerization zone comprises at least one reactor.

The fluoroalkyl monomer, ethylenically unsaturated monomer, polyester, and initiator can be contacted in the emulsion polymerization zone in any order. The pre-emulsion can be charged all at once (one shot method) to the emulsion polymerization zone, or the pre-emulsion can be charged gradually over time to the emulsion polymerization zone (gradual addition method). In the gradual addition method, pre-emulsion and initiator are charged to the emulsion polymerization zone over a period of time ranging from about 1 to about 10 hours, preferably, from about 2 to 8 hours. The initiator can be added similarly either by a one shot method or gradual addition method.

In another embodiment, the aqueous dispersion can be produced by a process comprising: 1) contacting at least one fluoroalkyl monomer, at least one water-dispersible polyester,,water, and optionally, at least one ethylenically unsaturated monomer to form a pre-emulsion; 2) shearing the pre-emulsion to produce a miniemulsion; and 3) polymerizing the miniemulsion in an emulsion polymerization zone under emulsion polymerization conditions to produce the aqueous dispersion.

Shearing of the pre-emulsion produces the mini-emulsion. The shearing can be conducted by any means known in the art. Generally, shearing can be achieved using a high shearing device to form droplets ranging in size from about 50 to about 1000 nanometers to form the mini-emulsion. An example of a high shearing device is a homogenizer.

The miniemulsion can be charged all at once (one shot method) to the emulsion polymerization zone, or the mini-emulsion can be charged gradually over time to the emulsion polymerization zone (gradual addition method). In the gradual addition method, miniemulsion and initiator are charged to the emulsion polymerization zone over a period of time ranging from about 1 to about 10 hours, preferably, from about 2 to 8 hours. The initiator can be added similarly either by a one shot method or gradual addition method.

The mini-emulsion, as described above, may also be polymerized as described in U.S. Pat. No. 5,686,518 and Wang et al., "Emulsion and Miniemulsion Copolymerization of Acrylic Monomers in the Presence of Alkyd Resin," *Journal of Applied Polymer Science*, Vol. 60, pp. 2069–2076 (1996), each of which is incorporated in its entirety by reference.

In another embodiment of this invention, a process to produce an aqueous dispersion is provided. The process comprises:

1) contacting at least one fluoroalkyl monomer, at least one ethylenically unsaturated monomer having up to 18 carbon atoms, water, at least one water-dispersible polyester, at least one internal crosslinking agent, at least one external crosslinking agent, at least one reactive surfactant, and at least one chain transfer agent to produce a pre-emulsion;

2) shearing the pre-emulsion to produce a mini-emulsion;

3) adding the pre-emulsion to an emulsion polymerization reactor;

4) contacting at least one water-dispersible polyester with water to produce a polyester/water mixture and routing the polyester/water mixture to the emulsion polymerization reactor;

5) contacting at least one initiator and water to produce an initiator solution and routing the initiator solution to the emulsion polymerization reactor to produce a reaction mixture; and 6) polymerizing said reaction mixture to produce the aqueous dispersion.

In another embodiment of this invention, a process is provided to produce an aqueous dispersion. The process comprises:

1) contacting a mixed fluoroacrylate monomer stream, lauryl methacrylate, water, polyethylene glycol polyester, n-methyol acrylamide, and polyoxyethylene alkyl propenylphenyl ether sulfate to produce a pre-emulsion; wherein the mixed fluoroacrylate monomer stream comprises 2-(perfluoroalkyl)ethyl acrylate 2) shearing the pre-emulsion to produce a mini-emulsion;

3) adding the pre-emulsion to an emulsion polymerization reactor;

4) contacting a polyethylene glycol polyester dispersion with water to produce a polyester/water mixture and routing the polyester/water mixture to the emulsion polymerization reactor;

5) contacting at least one initiator and water to produce an initiator solution and routing the initiator solution to the emulsion polymerization reactor to produce a reaction mixture; and
6) polymerizing the reaction mixture to produce the aqueous dispersion.

In still another embodiment of this invention, a process to produce an aqueous dispersion is provided. The process comprises:
1) contacting at least one fluoroalkyl monomer, at least one ethylenically unsaturated monomer having up to 18 carbon atoms, water, at least one water-dispersible polyester, at least one internal crosslinking agent, at least one external crosslinking agent, at least one reactive surfactant, and at least one chain transfer agent to produce a pre-emulsion;
2) shearing the pre-emulsion to produce a mini-emulsion;
3) contacting at least one water-dispersible polyester with water to produce a polyester/water mixture and routing the polyester/water mixture to an emulsion polymerization reactor;
4) contacting at least one initiator and water to produce an initiator solution;
5) adding a portion of said initiator feed to the emulsion polymerization reactor; and
6) charging the miniemulsion and initiator solution to the emulsion polymerization reactor over a period of about 1 to about 10 hours under polymerization conditions to produce the aqueous dispersion.

In yet another embodiment of this invention, a process to produce an aqueous dispersion is provided. The process comprises:
1) contacting a mixed fluoroacrylate monomer stream, lauryl methacrylate, water, polyethylene glycol polyester, n-methyol acrylamide, diallylmaleate, n-dodecylmercaptan, and polyoxyethylene alkyl propenylphenyl ether sulfate to produce a pre-emulsion; wherein the mixed fluoroacrylate monomer stream comprises 2-(perfluoroalkyl)ethyl acrylate
2) shearing the pre-emulsion to produce a mini-emulsion;
3) contacting a polyethylene glycol polyester dispersion with water to produce a polyester/water mixture and routing the polyester/water mixture to an emulsion polymerization reactor;
4) contacting at least one initiator and water to produce an initiator solution;
5) adding a portion of said initiator feed to the emulsion polymerization reactor; and
6) charging the miniemulsion and initiator solution to the emulsion polymerization reactor over a period of about 1 to about 10 hours under polymerization conditions to produce the aqueous dispersion.

The aqueous dispersion of this invention generally has a polymer concentration ranging from about 10% to about 50% based on the weight of the aqueous dispersion, preferably 20% to 30%. The aqueous dispersion obtained by this invention may be used by itself as it is obtained from the emulsion polymerization zone or it can be purified to remove, for example, unreacted monomers. Further, the composition of the aqueous dispersion may be adjusted by adding a surfactant or by diluting with water or an aqueous medium. In addition, various additives can be added to the aqueous dispersion after it is produced. Such additives include, but are not limited to, other water repellents and oil repellents, anti-fungus agents, flame retardants, antistatic agents, crease-proofing agents, antimigrants, deformers, binders, and other antifouling agents.

In another embodiment of this invention, an acid-generating compound is added to the aqueous dispersion to produce an acid-treated aqueous dispersion. The acid-generating compound can be any that is known in the art. Examples of the acid-generating compound include, but are not limited to, sulfuric acid, hydrochloric acid, phosphoric acid, phosphorous acid, acetic acid, hydroxy acetic acid, citric acid, sulfonic acid and their respective salts formed by ammonia, amines, aminoalcohols, and alkali metal and alkaline earth metal hydroxides. Sulfonic acids include alkyl sulfonic acids and aromatic sulfonic acids. Most preferably, para-toulene sulfonic acid is used.

The acid-generating compound can be added prior to, during, or after polymerization. Generally, the amount of the acid-generating compound is that which is sufficient to improve the oil and water repellency of a substrate contacted with the acid-treated aqueous dispersion when compared to an aqueous dispersion not treated with the acid-generating compound. Preferably, the amount of the acid-generating compound added to the aqueous dispersion ranges from about 0.01% by weight to about 0.4% by weight based on the weight of the aqueous dispersion, preferably 0.1% to 0.2% by weight.

The aqueous dispersion or the acid-treated aqueous dispersion of the present invention is applied by a method of coating on the surface of a substrate to be treated according to a known process such as dip coating, followed by drying or a method of spraying a treating liquid by a spray.

The substrate to be treated with the aqueous dispersion or acid-treated aqueous dispersion of the present invention may be any textile or paper material and is not specifically limited. Examples of the textile include, but are not limited to, animal- or vegetable-origin natural fibers such as cotton, hemp, wool, silk, etc.; synthetic fibers such as polyamide, polyester, polyvinyl alcohol, polyacrylonitrile, polyvinyl chloride, polypropylene, etc.; semisynthetic fibers such as rayon, acetate, etc.; and a mixture of these fibers. The textile may be in any form such as a fiber, a yarn, a fabric and the like. When the textile is a carpet, the carpet may be formed from fibers or yarns treated with the aqueous dispersion or acid-treated aqueous dispersion of the present invention. Alternatively, the carpet itself may be treated with the aqueous dispersion or acid-treated aqueous dispersion of the present invention.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Production of the Inventive Aqueous Dispersion—One Shot Addition of Miniemulsion and Initiator Solution The components and the order of addition are summarized in Table 1.

TABLE 1

| Component Number | Component | Type | Amount (wt %) |
|---|---|---|---|
| 1 | Deionized Water | Water | 27.61 |
| 2 | Lubril QC[1] | Polyester | 12.38 |
| 3 | n-Methylol Acrylamide[2] | Cross-Linking Agent | 0.70 |
| 4 | Hitenol BC 20/20%[3] | Reactive Surfactant | 1.02 |
| 5 | Lauryl Methacrylate | Acrylic monomer | 6.50 |
| 6 | Perfluoro($C_6$–$C_{14}$) ethylacrylate[4] | Fluoroalkyl Monomer | 9.73 |
| 7 | Wako VA-044[5] | Initiator | 0.586 |
| 8 | Deionized Water | Water | 0.54 |
| 9 | Lubril QC | Initiator | 0 |
| 10 | Deionized Water | Water | 41.2 |

[1]Lubril QC is a polyethylene glycol polyester dispersion obtained from Eastman Chemical Company.
[2]N-methyl acrylamide –45% by weight active solution of N-methylol acrylamide.
[3]Hitenol BC 20/20% is a 20% solids solution of Hitenol BC 20 which is a polyoxyethylene alkylpropenylphenyl ether sulfate obtained from Dai-Ichi Kogyo Seiyaku Co., Ltd. of Japan.
[4]Perfluoro($C_6$–$C_{14}$)ethylacrylate typically has by weight ≦15% $C_6$, ≧45% $C_8$, ≦30% $C_{10}$, ≦10% $C_{12}$, and ≦5% $C_{14}$.
[5]Wako VA-044 is 2,2'-Azobis[2-(2-imidazolin-2-yl)propane] dihydrochloride with CAS# 27776-21-2 and was obtained from Wako Chemicals USA, Inc.

Components 1–6 were charged to a 1400 mL beaker to produce a pre-emulsion. The beaker was heated to 140° F. to 150° F. and stirred uniformly for 5 minutes. The pre-emulsion was routed two times through a Microfluidics homogenizer to produce a miniemulsion having a particle size of less than 300 nm. The miniemulsion was added to a reaction flask.

Components 9 and 10 (polyester and deionized water) were charged to a reaction flask. Nitrogen purge was started, and the contents of the flask were heated to 140 to 150° F. The reaction flash was set up for reflux.

Components 7 and 8 (initiator and water) were mixed to produce an initiator solution, and the initiator solution was added to the reaction flask. The temperature of the reaction flask was held at 140° F. to 150° F. for 6 hours. The reaction flask was cooled to 100° F., and the nitrogen purge turned off. The aqueous dispersion was recovered from the reaction flask and filtered.

Example 2

Production of the Inventive Acid-Treated Aqueous Dispersion—Gradual Addition of Miniemulsion and Initiator Solution A 1500 milliliter resin flask was set up with reflux and one side feed. Nitrogen purge was started from the bottom of the resin flask.

The components and the order of addition are summarized in Table 2.

TABLE 2

| Component Number | Component | Type | Amount (wt %) |
|---|---|---|---|
| 1 | Deionized Water | Water | 27.47 |
| 2 | Lubril QC[1] | Polyester | 11.12 |
| 3 | n-Methylol Acrylamide[2] | Cross-Linking Agent | 0.70 |
| 4 | Hitenol BC 20/20%[3] | Reactive Surfactant | 1.02 |
| 5 | Lauryl Methacrylate | Acrylic monomer | 6.47 |
| 6 | Diallylmaleate | Internal cross-linker | 0.31 |
| 7 | n-Dodecylmercaptan | Chain Transfer Agent | 0.03 |
| 8 | Perfluoro($C_6$–$C_{14}$) ethylacrylate[4] | Fluoroalkyl Monomer | 9.65 |
| 9 | Wako V-50[5] | Initiator | 0.007 |
| 10 | Deionized Water | Water | 0.83 |
| 11 | Wako V-50 | Initiator | 0.014 |
| 12 | Deionized Water | Water | 23.21 |
| 13 | Deionized Water | Water | 16.61 |
| 14 | Lubril QC | Polyester | 1.19 |
| 15 | Wako V-50 | Initiator | 0.01 |
| 16 | Deionized Water | Water | 0.83 |
| 17 | Para-toluene Sulfonic Acid | Acid-Generating Compound | 0.26 |
| 18 | Deionized Water | Water | 0.26 |

[1]Lubril QC is a polyethylene glycol polyester dispersion obtained from Eastman Chemical Company.
[2]N-methylol acrylamide –48% by weight active solution of N-methylol acrylamide.
[3]Hitenol BC 20/20% is a 20% solids solution of Hitenol BC 20 which is a polyoxyethylene alkylpropenylphenyl ether sulfate obtained from Dai-Ichi Kogyo Seiyaku Co., Ltd. of Japan.
[4]Perfluoro($C_6$–$C_{14}$)ethylacrylate typically has by weight ≦15% $C_6$, ≧45% $C_8$, ≦30% $C_{10}$, ≦10% $C_{12}$, and ≦5% $C_{14}$.
[5]Wako V-50 is 2,2'-azobis(2-aminopropane)dihydrochloride with CAS # 2997-92-4 and was obtained from Wako Chemicals USA, Inc.

Components 1–8 were charged to a 1400 mL beaker to produce a pre-emulsion. The beaker was heated to 150° F. to 160° F. and stirred uniformly for 5 minutes. The pre-emulsion was routed four times through a Microfluidics homogenizer to produce a miniemulsion having a particle size of less than 300 nm.

Components 13 and 14 (deionized water and water dispersible polyester) were charged to the resin flask. Medium agitation was started, and the flask was heated to a temperature in a range of 140° F. to 150° F.

Components 11 and 12 (initiator and deionized water) were mixed to produce an initiator solution and charged to the side feed. Nitrogen purge was started, and the contents of the flask were heated to 140 to 150° F.

Components 9 and 10 (initiator and deionized water) were mixed together and added to the flask.

The miniemulsion and initiator solution were charged separately to the flask over a 4 hour period. After the miniemulsion and initiator solution were added, components 15 and 16 (initiator and deionized water) were mixed together and added to the flask. The temperature was held for one hour to complete the polymerization producing an aqueous dispersion. The flask was then cooled to 100° F. or below. The nitrogen purge was ended, and the flask was stirred for another 10 minutes prior to recovering the aqueous dispersion.

Components 17 and 18 (acid-generating compound and water) were mixed together and added to the aqueous dispersion to produce the acid-treated aqueous dispersion.

Example 3

Foaming Evaluation

A 1.0% by weight aqueous dispersion of the various fluorocarbon compositions in Table 3 was made. 50 milliliters of the dispersion were poured into a 200 milliliter graduated cylinder. A stopper was placed in the graduated cylinder, and the cylinder was inverted 20 times. The level of foam in milliliters was measured from the original level of aqueous dispersion in the graduated cylinder. The data are tabulated in Table 3.

TABLE 3

| Examples # | Fluorocarbon Composition | Foam (ml) |
|---|---|---|
| Inventive 3.1 | Acid-Treated Aqueous Dispersion[1] | 11 |
| Inventive 3.2 | Acid-Treated Aqueous Dispersion[1] | 10 |
| Comparative 3.1 | APG-705[2] | 14 |
| Comparative 3.2 | APG-5264[2] | 14 |
| Comparative 3.3 | APG-10[2] | 16 |
| Comparative 3.4 | APG-14[2] | 11 |
| Comparative 3.5 | APG 5233[2] | 24 |
| Comparative 3.6 | Repearl F 84[3] | 21 |
| Comparative 3.7 | Repearl F 8025[3] | 19 |
| Comparative 3.8 | Zonyl 5410[4] | 14 |
| Comparative 3.9 | Zonyl 8412[4] | 15 |

[1]Inventive acid-treated aqueous dispersions.
[2]Fluoroalkyl dispersion obtained from Advanced Polymer, Incorporated.
[3]Fluoroalkyl dispersion obtained from Mitsubishi International.
[4]Fluoroalkyl dispersion obtained from Dupont.

From the above data, it is clearly shown that the inventive acid-treated aqueous dispersion reduced foaming over the comparative fluorocarbon dispersions.

fabric. The cured, coated fabric was then tested for repellency according to the American Association of Textile Chemist and Colorists (AATCC) Technical Manual Method 118-2002.

To summarize the method, the cured, coated fabric was laid on a flat surface. A pipette was used to place 3 single drops of specified alkane or alcohol/water solution on the surface of the cured, coated fabric. After 30 seconds, the appearance of the drops was rated to a photo scale. The ratings are associated with the, particular alkane or alcohol/water solution in question.

TABLE 4

| Component | Amount (wt %) |
|---|---|
| ABCO Builder T-37[1] | 30.0 |
| Water | 66.5 |
| Polyacrylamide Antimigrant | 2.0 |
| Mineral Oil Defoamer | 0.5 |
| Fluorocarbon Dispersion (20% by wt. Solids) | 1.0 |

[1]Acrylic binder having a Tg = 37° C. obtained from Eastman Chemical Company.

TABLE 5

| Example # | Fluorocarbon Dispersion | Isopropanol | Isopropanol/Water (w/w) (90/10) | n-heptane | n-decane | Drakeol #34[2] |
|---|---|---|---|---|---|---|
| Inventive 5.1 | Acid-Treated Aqueous Dispersion | Pass (A)[3] | | Fail (C)[5] | Pass (A) | Pass (A) |
| Comparative 5.1 | Zonyl 8412 | Pass (B)[4] | | Fail (D) | Pass (B) | Pass (A) |
| Comparative 5.2 | APG-705 | Fails (D)[6] | Fail (D) | Fail (D) | Fail (C) | Pass (A) |
| Comparative 5.3 | APG-5233 | Fail (D) | Fail (D) | Fail (D) | Fail (D) | Fail (C) |
| Comparative 5.4 | APG-5264 | Fail (D) | Fail (D) | Fail (D) | Fail (D) | Fail (C) |
| Comparative 5.5 | Boehme FC 4000[1] | | Pass (A) | Fail (D) | Fail (D) | Pass (A) |

[1]Boehme FC 4000 was obtained from Boehme Filatex, Inc.
[2]Drakeol #34 is a high molecular alkane obtained from Penreco.
[3]Passes (A) means the liquid forms a clear well-rounded drop.
[4]Passes (B) means a borderline pass; rounding drop with partial darkening.
[5]Fails (C) means wicking apparent and/or complete wetting.
[6]Fails (D) means complete wetting.

Example 4

Oil and Alcohol Repellency

The components contained in Table 4 were mixed together to produce an oil and water-repellent composition. Different fluorocarbon dispersions as shown in Table 5 were utilized to produce varying oil and water repellent compositions. Each oil and water-repellent composition was then padded on 100% polyester terephthalate stitchbonded fabric at 40 psig to produce a coated fabric. The coated fabric was then dried for 3 minutes at 350° F. to produce a cured, coated From these data, it is shown that the inventive acid-treated aqueous dispersion had superior performance over the comparative examples and failed only to repel n-heptane. Comparative example 5.1 passed the repellency test for Drakeol #34, however, it had a borderline pass for repellency of isopropanol and n-decane and had complete wetting of the fabric for n-heptane. The fluorocarbon compounds in comparative examples 5.2–5.4 failed across the board in the repellency tests except comparative 5.2 was able to repel the Drakeol #34 compound. In comparative example 5.5, the fluorocarbon dispersion passed the repellency test for Isopropanol (90/10) and Drakeol #34, but it had complete wetting in the repellency of n-heptane and n-decane.

That which is claimed is:

1. A pre-emulsion comprising at least one fluoroalkyl monomer, at least one water-dispersible polyester, water and optionally an ethylenically unsaturated monomer; wherein the fluoroalkyl monomer is represented by the formula: Rf-Q-OCOCR=CH$_2$; wherein Q is a bivalent organic group, and R is hydrogen atom or methyl group; wherein Q is selected from the group consisting of —(CH$_2$)$_{p+q}$—; —(CH$_2$)$_p$CONH(CH$_2$)$_q$—; —(CH$_2$)$_p$OCONH(CH$_2$)$_q$—; —(CH$_2$)$_p$SO$_2$NR'(CH$_2$)$_q$—; —(CH$_2$)$_p$NHCONH(CH$_2$)$_q$—; or —(CH$_2$)$_p$CHOH—(CH$_2$)$_q$—; wherein R' is a hydrogen or an alkyl group, and each of p and q is an integer of at least 0, provided that p+q is an integer of from 1 to 22.

2. A pre-emulsion according to claim 1 wherein said fluoroalkyl monomer is selected from the group consisting of:

F(CF$_2$)$_5$CH$_2$OCOCR=CH$_2$,
F(CF$_2$)$_6$CH$_2$CH$_2$OCOCR=CH$_2$,
H(CF$_2$)$_6$CH$_2$CH$_2$OCOCR=CH$_2$,
F(CF$_2$)$_8$CH$_2$CH$_2$OCOCR=CH$_2$,
i-C$_3$F$_7$(CF$_2$)$_5$CH$_2$CH$_2$OCOCR=CH$_2$,
F(CF$_2$)$_8$SO$_2$N(C$_3$H$_7$)CH$_2$CH$_2$OCOCR=CH$_2$,
F(CF$_2$)$_8$(CH$_2$)$_4$OCOCR=CH$_2$,
F(CF$_2$)$_8$SO$_2$N(CH$_3$)CH$_2$CH$_2$OCOCR=CH$_2$,
F(CF$_2$)$_8$SO$_2$N(C$_2$H$_5$)CH$_2$CH$_2$OCOCR=CH$_2$,
F(CF$_2$)$_8$CONHCH$_2$CH$_2$OCOCR=CH$_2$,
i-C$_3$F$_7$(CF$_2$)$_5$(CH$_2$)$_3$OCOCR=CH$_2$,
i-C$_3$F$_7$(CF$_2$)$_5$CH$_2$CH(OCOCH$_3$)OCOCR=CH$_2$,
i-C$_3$F$_7$(CF$_2$)$_5$CH$_2$CH$_2$CH(OH)CH$_2$OCOCR=CH$_2$,
F(CF$_2$)$_9$CH$_2$CH$_2$OCOCR=CH$_2$, and
F(CF$_2$)$_9$CONHCH$_2$CH$_2$OCOCR=CH$_2$; wherein R represents a hydrogen or a methyl group, and i-C$_3$F$_7$ represents a perfluoroisopropyl group [(CF$_3$)$_2$CF—].

3. A pre-emulsion according to claim 1 wherein said fluoroalkyl compound is perfluoroalkylethyl acrylate or perfluoroalkylmethyl acrylate; wherein the alkyl group has about 6 to about 14 carbon atoms.

4. A pre-emulsion according to claim 1 wherein said ethylenically unsaturated monomer is at least one selected from the group consisting of styrenic compounds, ethylenically unsaturated compounds, nitrogen-containing compounds, vinyl chloride, and vinylidene chloride.

5. A pre-emulsion according to claim 4 wherein said styrenic compound is at least one selected from the group consisting of styrene, α-methyl styrene, vinyl naphthalene, vinyl toluene, and chloromethyl styrene.

6. A pre-emulsion according to claim 4 wherein said ethylenically unsaturated compounds is at least one selected from the group consisting of methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate ethylhexyl acrylate, ethylhexyl methacrylate, octyl acrylate, octyl methacrylate, isodecyl acrylate, isodecyl methacrylate, lauryl methacrylate, lauryl acrylate, tridecyl acrylate, tridecyl methacrylate, stearyl acrylate, stearyl methacrylate glycidyl methacrylate, alkyl crotonates, vinyl acetate, di-n-butyl maleate, di-octylmaleate, acetoacetoxyethyl methacrylate, acetoacetoxyethyl acrylate, acetoacetoxypropyl methacrylate, acetoacetopropryl acrylate, diacetone acrylamide, acrylamide, methacrylamide, hydroxyethyl methacrylate, hydroxyethyl acrylate, allyl methacrylate, tetrahydrofurfuryl methacrylate, tetrahydrofurfuryl acrylate, cyclohexyl methacrylate, cyclohexyl acrylate, n-hexyl acrylate, n-hexyl methacrylate, 2-ethoxyethyl acrylate, 2-ethoxyethyl methacrylate, isodecyl methacrylate, isodecyl acrylate, 2-methoxy acrylate, 2-methoxy methacrylate, 2-(2-ethoxyethoxy) ethylacrylate, 2-phenoxyethyl acrylate, 2-phenoxyethyl methacrylate, isobornyl acrylate, isobornyl methacrylate, caprolactone acrylate, caprolactone methacrylate, polypropyleneglycol monoacrylate, polypropyleneglycol monomethacrylate, poyethyleneglycol(400) acrylate, polypropyleneglycol(400) methacrylate, benzyl acrylate, benzyl methacrylate, sodium 1-allyloxy-2-hydroylpropyl sulfonate, and acrylonitrile.

7. A pre-emulsion according to claim 4 wherein said nitrogen containing compounds is at least one selected from the group consisting of Nitrogen-containing compounds include, but are not limited to, t-butylaminoethyl methacrylate, dimethylaminoethyl methacrylate, diethylaminoethyl methacrylate, N,N-dimethylaminopropyl ethacrylamided, methacrylamide, t-butylaminoethyl methacrylate, dimethylaminoethyl methacrylate, diethylaminoethyl methacrylated, N,N-dimethylaminopropyl methylcrylamide, 2-t-butylaminoethyl methacrylate, N,N-dimethylaminoethyl acrylate, 2-acrylamido-2-methylpropanesulfonic acid, N-(2-methacryloyloxy-ethyl)ethylene urea, methacrylamidoethylethylene urea.

8. A pre-emulsion according to claim 6 wherein said ethylenically unsaturated monomer is lauryl methacrylate.

9. A pre-emulsion according to claim 1 wherein said water-dispersible polyester is a polyethylene glycol polyester.

10. A miniemulsion comprising at least one fluoroalkyl monomer, at least one water-dispersible polyester, water, and optionally an ethylenically unsaturated monomer; wherein the fluoroalkyl monomer is represented by the formula: Rf-Q-OCOCR=CH$_2$; wherein Q is a bivalent organic group, and R is a hydrogen atom or methyl group; wherein Q is selected from the group consisting of —(CH$_2$)$_{p+q}$—; —(CH$_2$)$_p$CONH(CH$_2$)$_q$—; —(CH$_2$)$_p$OCONH(CH$_2$)$_q$—; —(CH$_2$)$_p$SO$_2$NR'(CH$_2$)$_q$—; —(CH$_2$)$_p$NHCONH(CH$_2$)$_q$—; or —(CH$_2$)$_p$CHOH—(CH$_{2q}$)—; wherein R' is a hydrogen or an alkyl group, and each of p and q is an integer of at least 0, provided that p+q is an integer of from 1 to 22.

11. A miniemulsion according to claim 10 wherein Q is selected from the group consisting of —(CH$_2$)$_{p+q}$—; —(CH$_2$)$_p$CONH(CH$_2$)$_q$—; —(CH$_2$)$_p$OCONH(CH$_2$)$_q$—; —(CH$_2$)$_p$ SO$_2$NR'(CH$_2$)$_q$—; —(CH$_2$)$_p$NHCONH(CH$_2$)$_q$—; or —(CH$_2$)$_p$CH(OH)—(CH$_2$)$_q$—; wherein R' is a hydrogen or an alkyl group, and each of p and q is an integer of at least 0, provided that p+q is an integer of from 1 to 22.

12. A miniemulsion according to claim 11 wherein said fluoroalkyl monomer is selected from the group consisting of:

F(CF$_2$)$_5$CH$_2$OCOCR=CH$_2$,
F(CF$_2$)$_6$CH$_2$CH$_2$OCOCR=CH$_2$,
H(CF$_2$)$_6$CH$_2$CH$_2$OCOCR=CH$_2$,
F(CF$_2$)$_8$CH$_2$CH$_2$OCOCR=CH$_2$,
i-C$_3$F$_7$(CF$_2$)$_5$CH$_2$CH$_2$OCOCR=CH$_2$,
F(CF$_2$)$_8$SO$_2$N(C$_3$H$_7$)CH$_2$CH$_2$OCOCR=CH$_2$,
F(CF$_2$)$_8$(CH$_2$)$_4$OCOCR=CH$_2$,
F(CF$_2$)$_8$SO$_2$N(CH$_3$)CH$_2$CH$_2$OCOCR=CH$_2$,
F(CF$_2$)$_8$SO$_2$N(C$_2$H$_5$)CH$_2$CH$_2$OCOCR=CH$_2$,
F(CF$_2$)$_8$CONHCH$_2$CH$_2$OCOCR=CH$_2$,
i-C$_3$F$_7$(CF$_2$)$_5$(CH$_2$)$_3$OCOCR=CH$_2$,
i-C$_3$F$_7$(CF$_2$)$_5$CH$_2$CH(OCOCH$_3$)OCOCR=CH$_2$,
i-C$_3$F$_7$(CF$_2$)$_5$CH$_2$CH$_2$CH(OH)CH$_2$OCOCR=CH$_2$,
F(CF$_2$)$_9$CH$_2$CH$_2$OCOCR=CH$_2$, and F(CF$_2$)$_9$CONHCH$_2$CH$_2$OCOCR=CH$_2$; wherein R represents a hydrogen or a methyl group, and i-C$_3$F$_7$ represents a perfluoroisopropyl group [(CF$_3$)$_2$CF—].

13. A miniemulsion according to claim 10 wherein said fluoroalkyl compound is perfluoroalkylethyl acrylate or perfluoroalkylmethyl acrylate; wherein the alkyl group has about 6 to about 14 carbon atoms.

14. A miniemulsion according to claim 10 wherein said ethylenically unsaturated monomer is at least one selected from the group consisting of styrenic compounds, ethylenically unsaturated compounds, nitrogen-containing compounds, vinyl chloride, and vinylidene chloride.

15. A miniemulsion according to claim 14 wherein said styrenic compound is at least one selected from the group consisting of styrene, α-methyl styrene, vinyl naphthalene, vinyl toluene, and chloromethyl styrene.

16. A miniemulsion according to claim 14 wherein said ethylenically unsaturated compounds is at least one selected from the group consisting of methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, octyl acrylate, octyl methacrylate, isodecyl acrylate, isodecyl methacrylate, lauryl methacrylate, lauryl acrylate, tridecyl acrylate, tridecyl methacrylate, stearyl acrylate, stearyl methacrylate, glycidyl methacrylate, alkyl crotonates, vinyl acetate, di-n-butyl maleate, di-octylmaleate, acetoacetoxyethyl methacrylate, acetoacetoxyethyl acrylate, acetoacetoxypropyl methacrylate, acetoacetopropryl acrylate, diacetone acrylamide, acrylamide, methacrylamide, hydroxyethyl methacrylate, hydroxyethyl acrylate, allyl methacrylate, tetrahydrofurfuryl methacrylate, tetrahydrofurfuryl acrylate, cyclohexyl methacrylate, cyclohexyl acrylate, n-hexyl acrylate, n-hexyl methacrylate, 2-ethoxyethyl acrylate, 2-ethoxyethyl methacrylate, isodecyl methacrylate, isodecyl acrylate, 2-methoxy acrylate, 2-methoxy methacrylate, 2-(2-ethoxyethoxy) ethylacrylate, 2-phenoxyethyl acrylate, 2-phenoxyethyl methacrylate, isobornyl acrylate, isobornyl methacrylate, caprolactone acrylate, caprolactone methacrylate, polypropyleneglycol monoacrylate, polypropyleneglycol monomethacrylate, poyethyleneglycol(400) acrylate, polypropyleneglycol(400) methacrylate, benzyl acrylate, benzyl methacrylate, sodium 1-allyloxy-2-hydroylpropyl sulfonate, and acrylonitrile.

17. A miniemulsion according to claim 14 wherein said nitrogen containing compound is at least one selected from the group consisting of methacrylamide, t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, 2-acrylamido-2-methylpropanesulfonic acid, N-(2-methacryloyloxy-ethyl) ethylene urea, methacrylamidoethylethylene urea.

18. A miniemulsion according to claim 14 wherein said ethylenically unsaturated monomer is lauryl methacrylate.

19. A miniemulsion according to claim 10 wherein said water-dispersible polyester is a polyethylene glycol polyester.

20. An aqueous dispersion comprising a polymer, at least one water-dispersible polyester, and water; wherein said polymer comprises repeating units from at least one fluoroalkyl monomer and optionally at least one ethylenically unsaturated monomer; wherein said fluoroalkyl monomer is a (meth)acrylate having a Rf group; wherein the Rf group is a group having at least two hydrogen atoms of an alkyl group substituted by fluorine atoms; wherein the fluoroalkyl monomer is represented by the formula Rf-Q-OCOCR=CH$_2$; wherein Q is a bivalent organic group, R is hydrogen atom or methyl group; wherein Q is selected from the group consisting of —(CH$_2$)$_{p+q}$—; —(CH$_2$)$_p$CONH (CH$_2$)$_q$—; —(CH$_2$)OCONH(CH$_2$)$_q$—; —(CH$_2$)$_p$SO$_2$NR' (CH$_2$)$_q$—; —(CH$_2$)$_p$NHCONH(CH$_2$)$_q$—; or —(CH$_2$)$_p$CHOH—(CH$_2$)$_q$—; wherein R' is a hydrogen or an alkyl group, and each of p and q is an integer of at least 0, provided that p+q is an integer of from 1 to 22; and wherein the amount of water-dispersible polyester solids in the aqueous dispersion ranges from 3% to 5% based on the total weight of said aqueous dispersion.

21. An aqueous dispersion according to claim 20 wherein the carbon number of said Rf group is from 2 to about 20.

22. An aqueous dispersion according to claim 21 wherein the carbon number of said Rf group is from 6 to 14.

23. An aqueous dispersion according to claim 20 wherein the number of fluorine atoms in said Rf group is at least 60%, as represented by [(the number of fluorine atoms in the Rf group)/(the number of hydrogen atoms contained in an alkyl group having the same carbon number as the Rf group)]×100(%).

24. An aqueous dispersion according to claim 23 wherein the number of fluorine atoms in said Rf group is at least 80%, as represented by [(the number of fluorine atoms in the Rf group)/(the number of hydrogen atoms contained in an alkyl group having the same carbon number as the Rf group)]×100(%).

25. An aqueous dispersion according to claim 24 wherein said Rf group is a perfluoroalkyl group.

26. An aqueous dispersion according to claim 25 wherein the number of carbon atoms in said perfluoralkyl group is from 2 to about 20.

27. An aqueous dispersion according to claim 21 wherein the fluoroalkyl monomer is represented by the formula: Rf-Q-OCOCR=CH$_2$; wherein Q is a bivalent organic group, and R is a hydrogen atom or methyl group.

28. An aqueous dispersion according to claim 27 wherein Q is selected from the group consisting of —(CH$_2$)$_{p+q}$—; —(CH$_2$)$_p$CONH(CH$_2$)$_q$—; (CH$_2$)$_p$OCONH(CH$_2$)$_q$—; —(CH$_2$)$_p$SO$_2$NR'(CH$_2$)$_q$—; (CH$_2$)$_p$NHCONH(CH$_2$)$_q$—; or —(CH$_2$)$_p$CH(OH)—(CH$_2$)$_q$—; wherein R' is a hydrogen or an alkyl group, and each of p and q is an integer of at least 0, provided that p+q is an integer of from 1 to 22.

29. An aqueous dispersion according to claim 28 wherein Q is selected from the group consisting of —(CH$_2$)$_{p+q}$—; —(CH$_2$)$_p$CONH(CH$_2$)$_q$—; and —(CH$_2$)$_p$SO$_2$NR'(CH$_2$)$_q$—; wherein q is an integer of at least 2; and p+q is from 2 to 6.

30. An aqueous dispersion according to claim 29 wherein Q is (CH$_2$)$_{p+q}$, and wherein p+q is from 2 to 6.

31. An aqueous dispersion according to claim 28 wherein said fluoroalkyl monomer is selected from the group consisting of:

F(CF$_2$)$_5$CH$_2$OCOCR=CH$_2$,
F(CF$_2$)$_6$CH$_2$CH$_2$OCOCR=CH$_2$,
H(CF$_2$)$_6$CH$_2$CH$_2$OCOCR=CH$_2$,
F(CF$_2$)$_8$CH$_2$CH$_2$OCOCR=CH$_2$,
i-C$_3$F$_7$(CF$_2$)$_5$CH$_2$CH$_2$OCOCR=CH$_2$,
F(CF$_2$)$_8$SO$_2$N(C$_3$H$_7$)CH$_2$CH$_2$OCOCR=CH$_2$,
F(CF$_2$)$_8$(CH$_2$)$_4$OCOCR=CH$_2$,
F(CF$_2$)$_8$SO$_2$N(CH$_3$)CH$_2$CH$_2$OCOCR=CH$_2$,
F(CF$_2$)$_8$SO$_2$N(C$_2$H$_5$)CH$_2$CH$_2$OCOCR=CH$_2$,
F(CF$_2$)$_8$CONHCH$_2$CH$_2$OCOCR=CH$_2$,
i-C$_3$F$_7$(CF$_2$)$_5$(CH$_2$)$_3$OCOCR=CH$_2$,
i-C$_3$F$_7$(CF$_2$)$_5$CH$_2$CH(OCOCH$_3$)OCOCR=CH$_2$,
i-C$_3$F$_7$(CF$_2$)$_5$CH$_2$CH$_2$CH(OH)CH$_2$OCOCR=CH$_2$,
F(CF$_2$)$_9$CH$_2$CH$_2$OCOCR=CH$_2$, and $F(CF_2)_9CONHCH_2CH_2OCOCR=CH_2$; wherein R represents a hydrogen or a methyl group, and i-$C_3F_7$ represents a perfluoroisopropyl group [$(CF_3)_2CF-$].

32. An aqueous dispersion according to claim 27 wherein said fluoroalkyl compound is perfluoroalkylethyl acrylate or perfluoroalkylmethyl acrylate; wherein the alkyl group has about 6 to about 14 carbon atoms.

33. An aqueous dispersion according to claim 20 wherein said ethylenically unsaturated monomer is at least one selected from the group consisting of styrenic compounds, ethylenically unsaturated compounds, nitrogen-containing compounds, vinyl chloride, and vinylidene chloride.

34. An aqueous dispersion according to claim 33 wherein said styrenic compound is at least one selected from the group consisting of styrene, α-methyl styrene, vinyl naphthalene, vinyl toluene, and chloromethyl styrene.

35. An aqueous dispersion according to claim 33 wherein said ethylenically unsaturated compounds is at least one selected from the group consisting of methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate ethylhexyl acrylate, ethylhexyl methacrylate, octyl acrylate, octyl methacrylate, isodecyl acrylate, isodecyl methacrylate, lauryl methacrylate, lauryl acrylate, tridecyl acrylate, tridecyl methacrylate, stearyl acrylate, stearyl methacrylate, glycidyl methacrylate, alkyl crotonates, vinyl acetate, di-n-butyl maleate, di-octylmaleate, acetoacetoxyethyl methacrylate, acetoacetoxyethyl acrylate, acetoacetoxypropyl methacrylate, acetoacetopropyl acrylate, diacetone acrylamide, acrylamide, methacrylamide, hydroxyethyl methacrylate, hydroxyethyl acrylate, allyl methacrylate, tetrahydrofurfuryl methacrylate, tetrahydrofurfuryl acrylate, cyclohexyl methacrylate, cyclohexyl acrylate, n-hexyl acrylate, n-hexyl methacrylate, 2-ethoxyethyl acrylate, 2-ethoxyethyl methacrylate, isodecyl methacrylate, isodecyl acrylate, 2-methoxy acrylate, 2-methoxy methacrylate, 2-(2-ethoxyethoxy) ethylacrylate, 2-phenoxyethyl acrylate, 2-phenoxyethyl methacrylate, isobornyl acrylate, isobornyl methacrylate, caprolactone acrylate, caprolactone methacrylate, polypropyleneglycol monoacrylate, polypropyleneglycol monomethacrylate, poyethyleneglycol (400) acrylate, polypropyleneglycol(400) methacrylate, benzyl acrylate, benzyl methacrylate sodium 1-allyloxy-2-hydroylpropyl sulfonate, and acrylonitrile.

36. An aqueous dispersion according to claim 33 wherein said nitrogen containing compound is at least one selected from the group consisting of methacrylamide, t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, 2-acrylamido-2-methylpropanesulfonic acid, N-(2-methacryloyloxy-ethyl)ethylene urea, methacrylamidoethylethylene urea.

37. An aqueous dispersion according to claim 33 wherein said ethylenically unsaturated monomer has up to about 18 carbon atoms.

38. An aqueous dispersion according to claim 37 wherein said ethylenically unsaturated monomer is lauryl methacrylate.

39. An aqueous dispersion according to claim 20 wherein the amount of fluoroalkyl monomer repeating units in said polymer ranges from about 50 to about 100 weight percent based on the total weight of monomer utilized to produce said polymer.

40. An aqueous dispersion according to claim 39 wherein the amount of fluoroalkyl repeating units in said polymer ranges from about 60 to about 80 weight percent based on the total weight of monomer utilized to produce said polymer.

41. An aqueous dispersion according to claim 20 wherein said water-dispersible polyester is a polyethylene glycol polyester.

42. An aqueous dispersion according to claim 20 wherein the amount of said water-dispersible polyester solids in the aqueous dispersion ranges from about 1% to about 20% based on the total weight of said aqueous dispersion.

43. An aqueous dispersion according to claim 20 further comprising at least one compound selected from the group consisting of other water repellents and oil repellents, anti-fungus agents, flame retardants, antistatic agents, crease-proofing agents, antimigrants, defoamers, binders, and other antifouling agents.

44. A substrate coated with said aqueous dispersion of claim 20.

45. A substrate according to claim 44 wherein said substrate is selected from the group consisting of a fiber, yarn, thread, fabric, paper material, and carpet.

46. A fabric coated with said aqueous dispersion of claim 20.

* * * * *